April 29, 1924.  1,492,542
J. C. BERGNER
APPARATUS FOR COOKING
Original Filed March 10, 1922   8 Sheets-Sheet 2
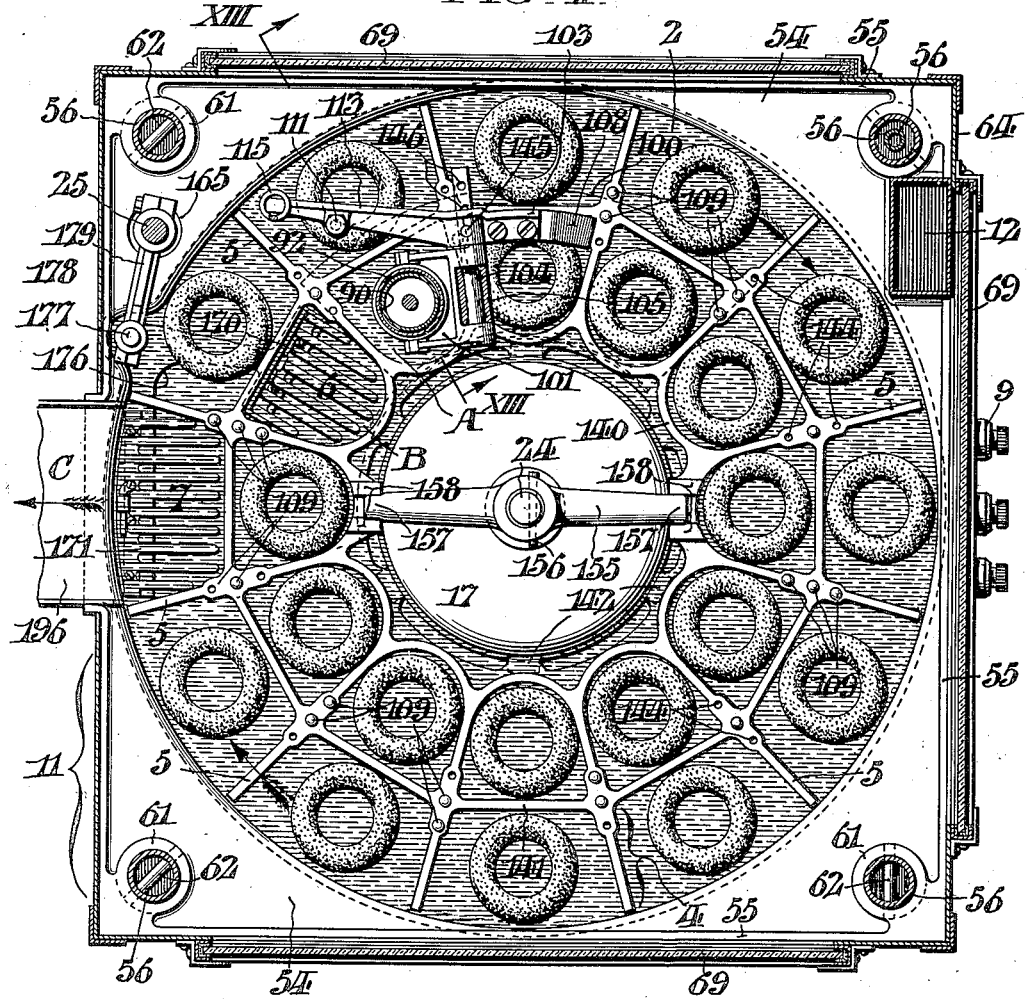
FIG. II.
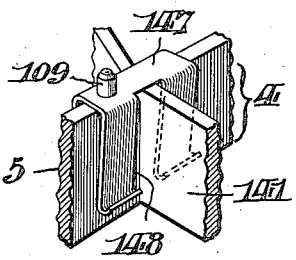
FIG. XII.
WITNESSES:
Alfred E. Ischinger
Thomas W. Kerr, Jr.
INVENTOR:
John C. Bergner,
BY Franey Paul
ATTORNEYS.

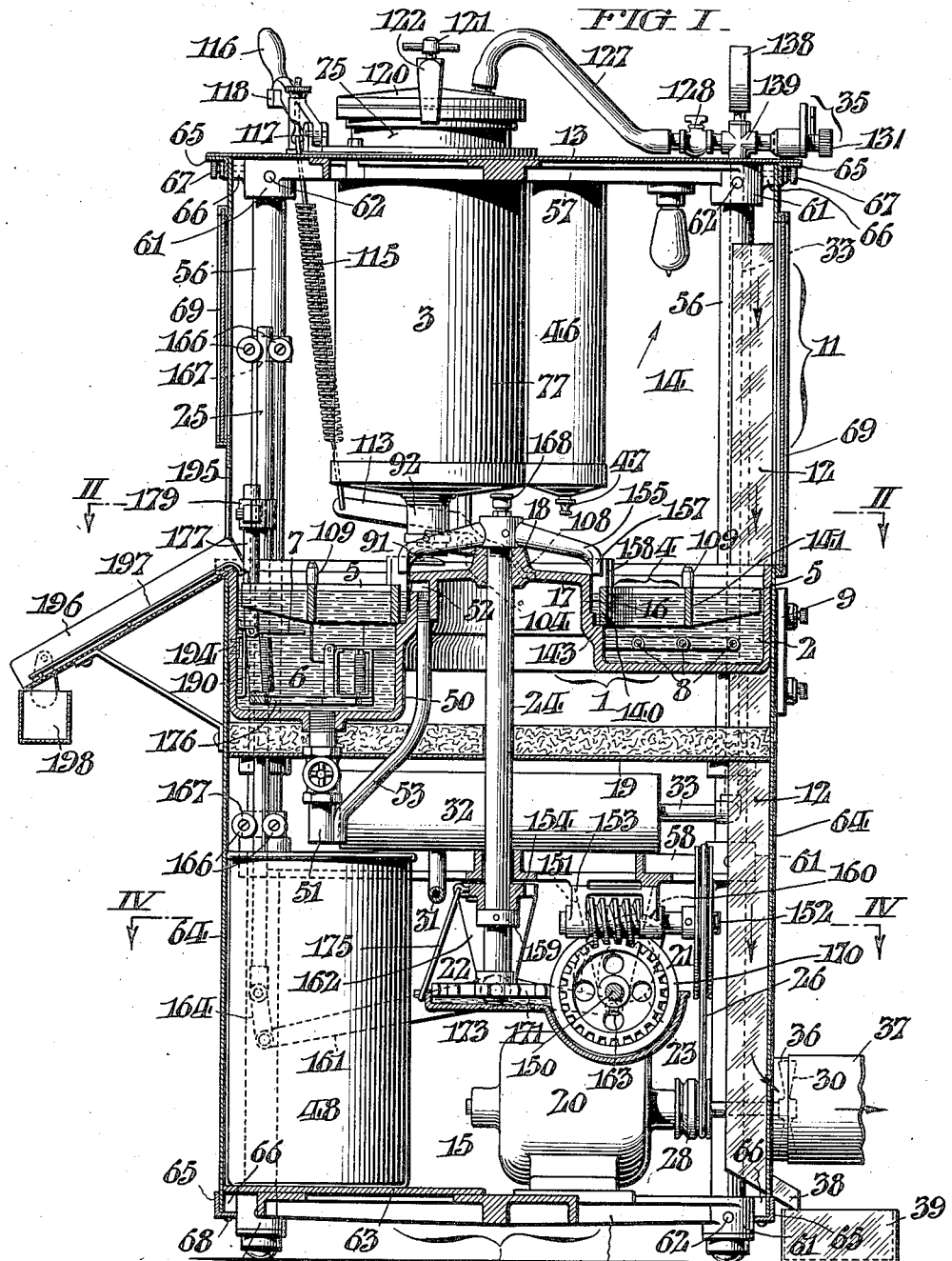

April 29, 1924.
J. C. BERGNER
APPARATUS FOR COOKING
Original Filed March 10, 1922    8 Sheets-Sheet 3
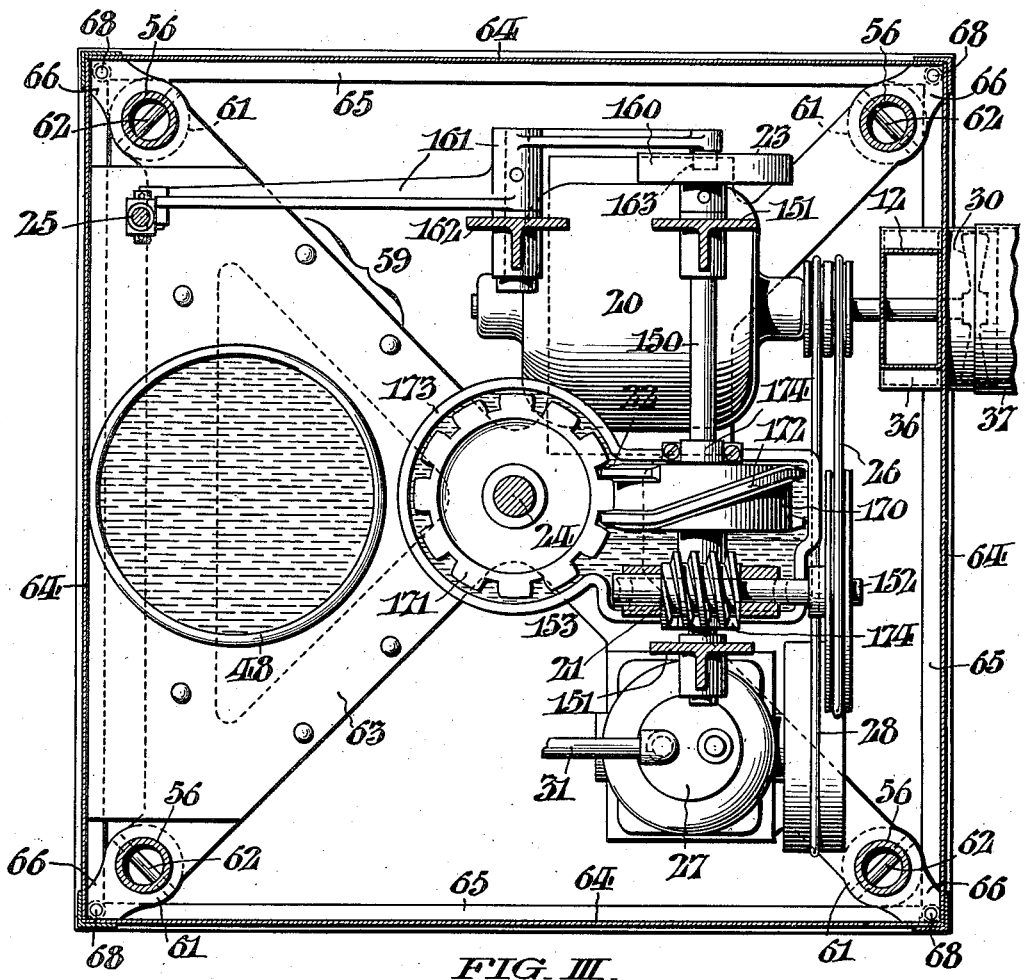
FIG. IV
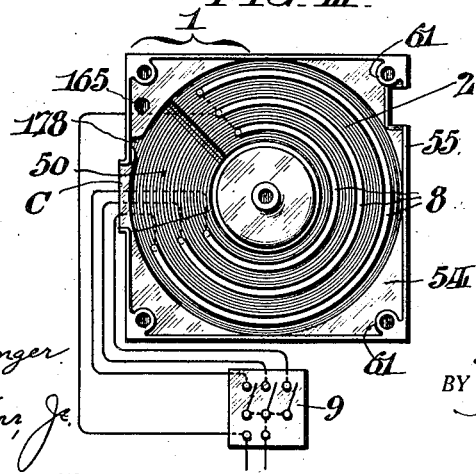
FIG. III
WITNESSES:
INVENTOR:
John C. Bergner;
BY
ATTORNEYS.

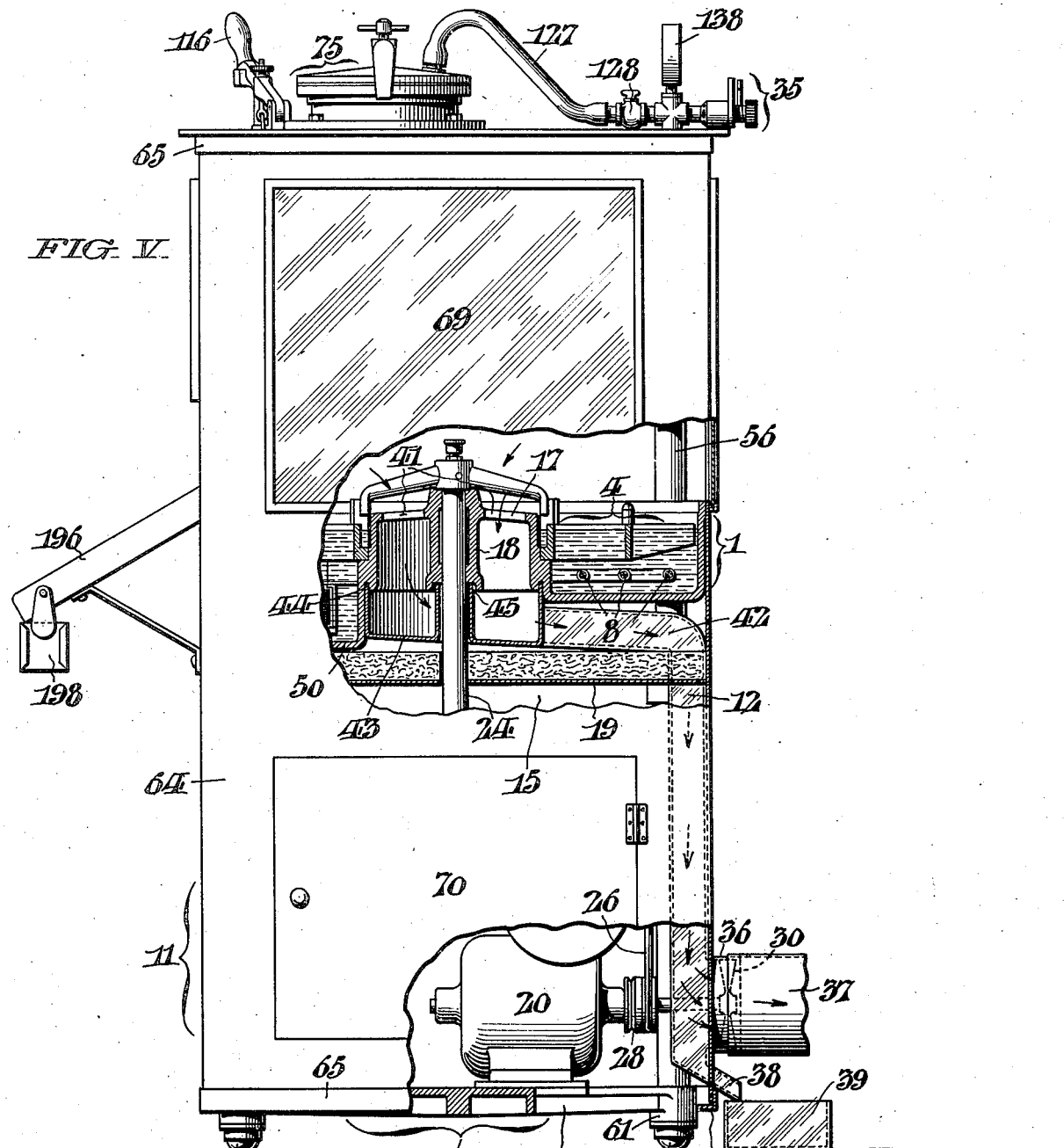

April 29, 1924.
J. C. BERGNER
APPARATUS FOR COOKING
Original Filed March 10, 1922 - 8 Sheets-Sheet 5
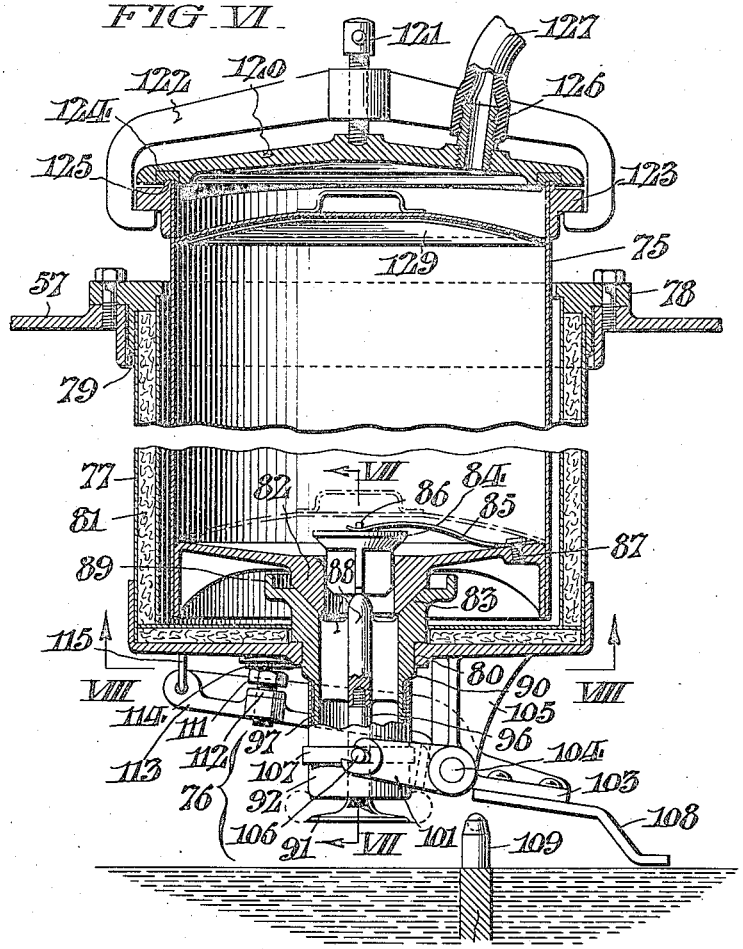
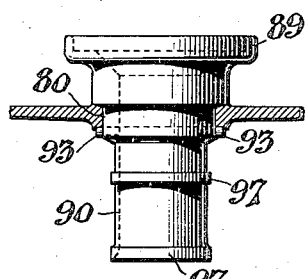
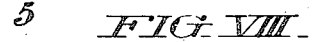
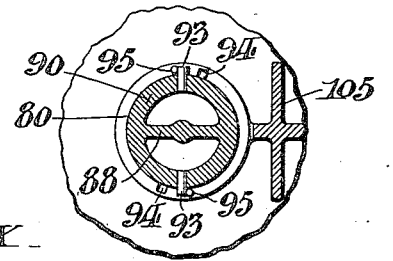

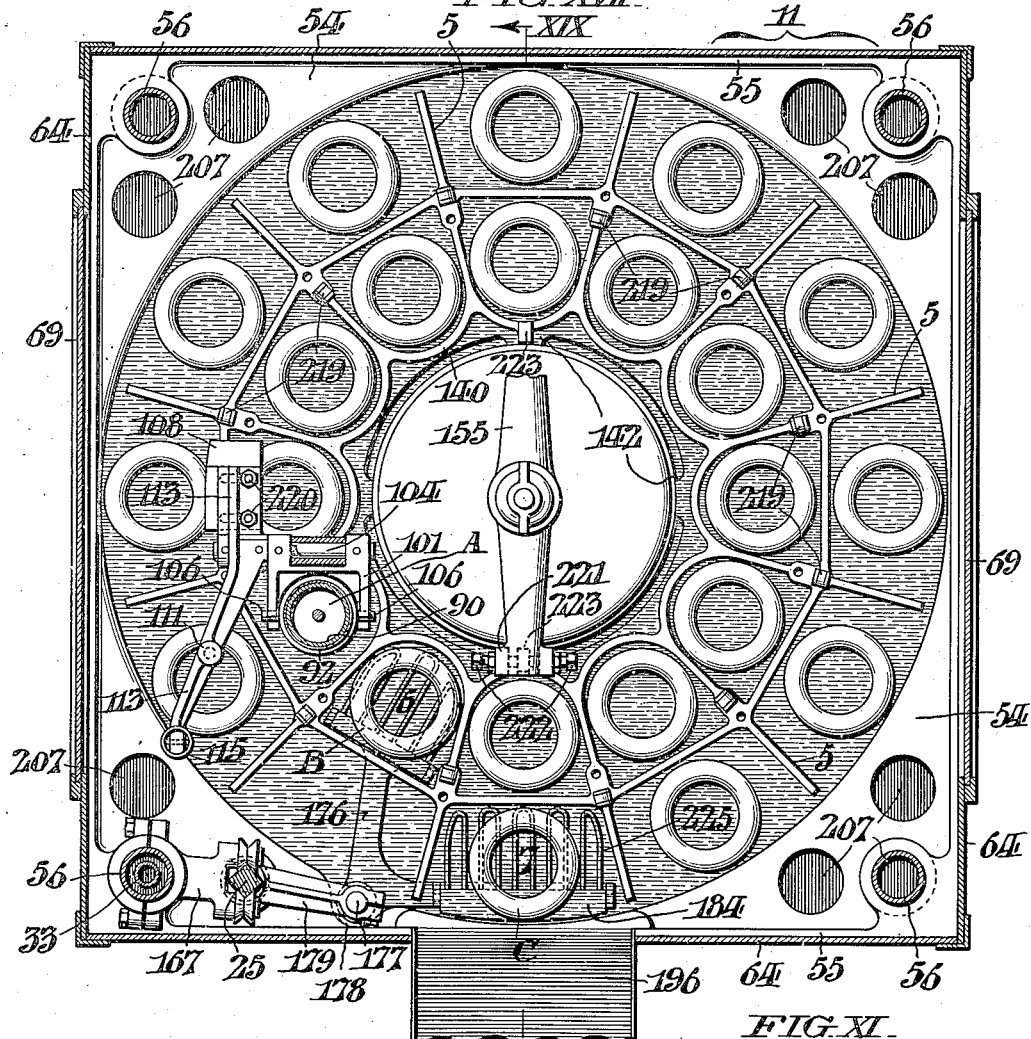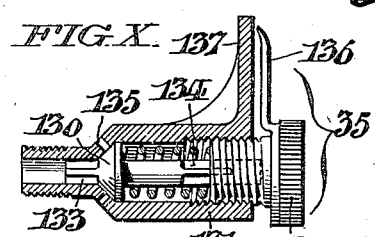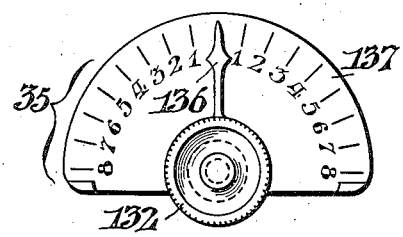

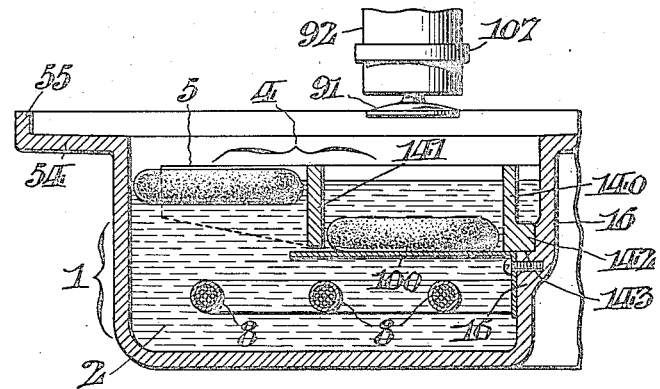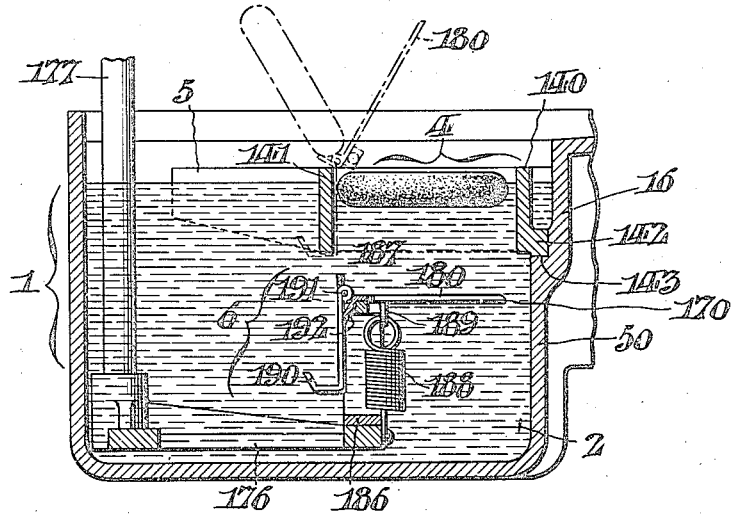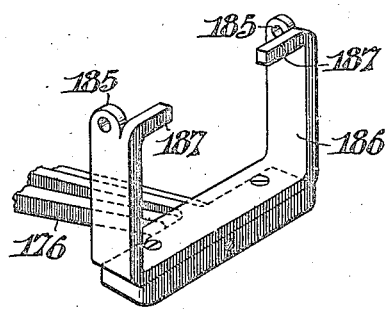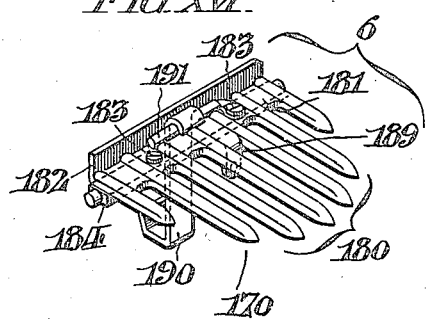

April 29, 1924.
J. C. BERGNER
APPARATUS FOR COOKING
Original Filed March 10, 1922  8 Sheets-Sheet 8
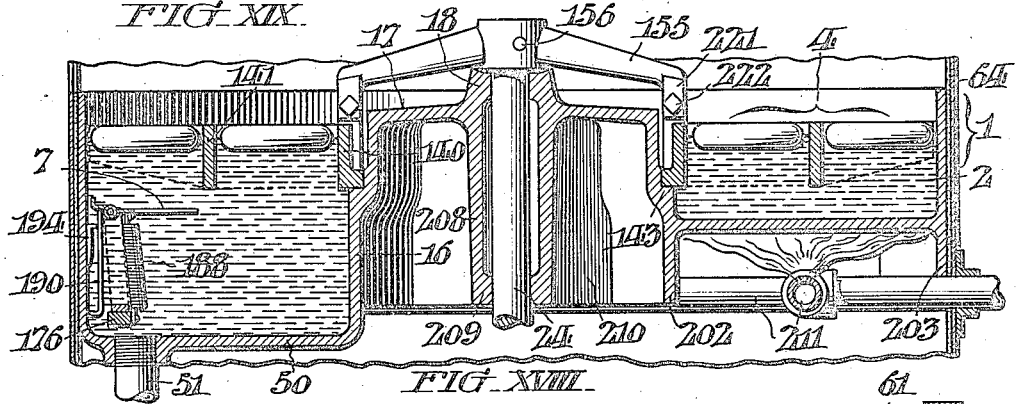
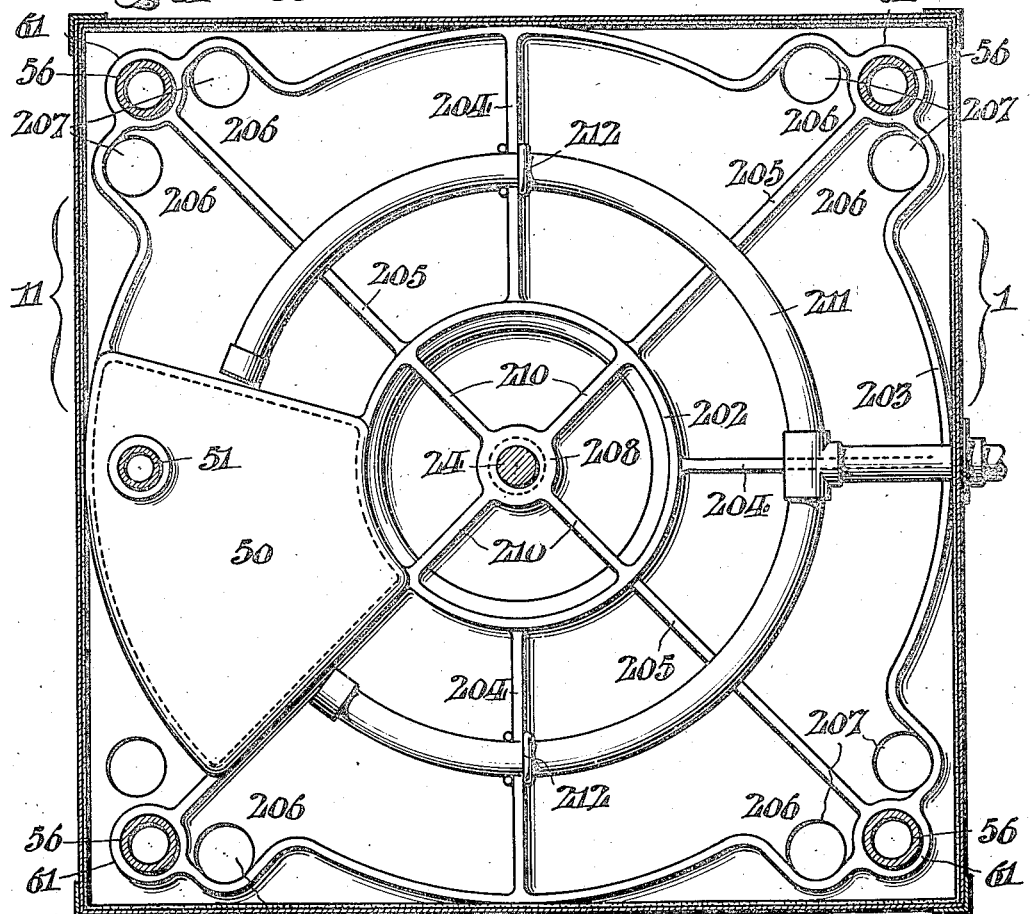

Patented Apr. 29, 1924.

1,492,542

UNITED STATES PATENT OFFICE.

JOHN C. BERGNER, OF PHILADELPHIA, PENNSYLVANIA, ASSIGNOR OF ONE-HALF TO FRANK ELLIS MORRIS, OF PHILADELPHIA, PENNSYLVANIA.

APPARATUS FOR COOKING.

Application filed March 10, 1922, Serial No. 542,614. Renewed March 20, 1924.

*To all whom it may concern:*

Be it known that I, JOHN C. BERGNER, a citizen of the United States, residing at Philadelphia, in the county of Philadelphia and State of Pennsylvania, have invented certain new and useful Improvements in Apparatus for Cooking, whereof the following is a specification, reference being had to the accompanying drawings.

My invention relates to apparatus for cooking, and for supplying or forming articles to be cooked; and the invention is especially concerned with the formation of articles of dough and the like, and with cooking effected by the employment of hot liquor or grease,—like the frying or articles such as doughnuts.

Hence the invention is more or less concerned with the manipulation of plastic material or dough at any and all stages: including its formation into articles, their introduction into the cooking liquor, and their manipulation during and after cooking. The introduction, manipulation, and cooking "free" of articles like crullers or doughnuts, whose form or integrity is important, and whose nature or condition renders them liable to deformation or disruption is at best a delicate matter; and the usual hollow or annular configuration of ordinary crullers or doughnuts generally enhances the difficulty.

Besides accurate and uniform initial formation of the articles, I aim at subsequently manipulating them with such delicacy that they shall not become materially deformed from their desired shape. I also aim to produce the finished articles continuously, rapidly, and conveniently, with minimum labor and expense, and of uniformly good quality and appearance; and, in general, to secure the well-known advantages of efficient and integrated automatic manufacture in quantity, under the most sanitary conditions. I further aim to make the operation of the apparatus flexibly and conveniently regulable, as regards both size of product and rate of output.

Not only does the invention admit of embodiment in a variety of specific forms and details, but, in its most highly organized aspects, it presents various novel features of operation and construction, and combinations and arrangement of mechanisms and parts, that are themselves valuable and useful,—either alone, or in other connections or relations than that shown,—as will readily be apparent to those skilled in the art from the description hereinafter of particular embodiments.

In the drawings, Fig. I is a vertical sectional view of a doughnut forming and cooking apparatus or machine conveniently embodying my invention, the section being so taken as to reveal most of the principal parts and mechanisms.

Fig. II is a plan view of the cooking receptacle or vessel and certain associated parts and devices on a larger scale than Fig. I, various overlying parts being broken away and removed about as indicated by the section line II—II in Fig. I.

Fig. III is a somewhat diagrammatic plan view of the cooking receptacle, with various parts and mechanisms shown in Fig. II removed in order to expose the electrical heating means therein for heating the liquor, and with a wiring diagram of the electrical connections.

Fig. IV is a similar view of various parts beneath the cooking receptacle, taken about as indicated by the section line IV—IV in Fig. I.

Fig. V is a side elevation of an apparatus similar to that shown in Fig. I, certain parts being broken away or in section in order to show modified provisions for disposal of fumes.

Fig. VI is a vertical mid-sectional view through the doughnut forming apparatus shown in Fig. I (on a larger scale), illustrating direct actuation of the forming device by means provided for manipulating and progressing the doughnuts in the cooking liquor.

Fig. VII is a fragmentary view at right angles to Fig. VI, partly in section as indicated by the line VII—VII in Fig. VI, illustrating the mounting of one of the die members shown in Fig. VI.

Fig. VIII is a fragmentary view from beneath, partly in section as indicated by the line VIII—VIII in Fig. VI, illustrating the same point as Fig. VII.

Fig. IX is a fragmentary side view, partly in section, illustrating a modification of one of the parts of the former.

Fig. X shows a longitudinal mid-section through a pressure regulating device for controlling the size and rate of production of the doughnuts.

Fig. XI is a front view of the regulator, from the right of Fig. V.

Fig. XII is a fragmentary perspective view of a modified device for actuating the former directly from the progressing means.

Fig. XIII is a fragmentary view showing a transverse section through the cooking receptacle in the neighborhood of the former, taken as indicated by the staggered line XIII—XIII in Fig. II.

Fig. XIV is a fragmentary view showing a transverse section through the cooking receptacle in the region of a device for manipulating and shifting the doughnuts during the cooking period.

Figs. XV and XVI are fragmentary perspective views illustrating the construction of the said manipulating means, on a larger scale than Fig. XIV.

Fig. XVII is a view similar to Fig. II showing a cooking receptacle structure modified to adapt it for gas heating, various modifications of the operating parts being also shown.

Fig. XVIII is an inverted plan view of the cooking receptacle structure shown in Fig. XVII.

Fig. XIX shows a vertical mid-section through the cooking receptacle, in the region of a device for manipulating the fully cooked doughnuts to eject them from the cooking liquor and from the apparatus, taken as indicated by the line XIX—XIX in Fig. XVII.

A brief preliminary general description of the embodiment of my invention here illustrated will make the subsequent description in detail more readily intelligible.

The apparatus here shown comprises (see Figs. I, II, III, and IV) a receptacle structure 1 with a circular vessel or pan 2 (of annular trough-like form) for the cooking liquor, and associated dough manipulating means. The manipulating means for supplying and introducing doughnuts (at "A", Fig. II) includes a forming apparatus 3 suitably stationed over the receptacle 2; while that for subsequently dealing with them includes a rotating carrier 4 with a succession of moving engagement members 5 for progressing the doughnuts in the liquor during cooking, and additional means 6, 7 for shifting them. By the means 6, 7, the doughnuts are (in the present case) first transferred (at "B", Fig. II) from one to another of two concentric annular courses or paths of progress in the liquor after partial cooking (and at the same time turned over or inverted, to permit them to cook better on the other side), and ultimately ejected from the liquor and from the apparatus (at "C", Figs. II and III) when fully cooked. As here shown, the liquor is heated by annular segmental metal-sheathed heating units 8 (Figs. I and III) arranged in the bottom of the pan 2, with space between their ends for the manipulating means 6, 7. These units 8 may be of equal resistance, and may be connected with a switch 9 for switching them in and out of circuit one by one, in parallel, for the purpose of varying and regulating the heat as required.

There is a framework 10 for supporting the receptacle structure 1, the forming apparatus 3, and various associated parts, and also an enclosure 11 over the receptacle 2, which serves to confine fumes from the hot liquor, etc. The enclosure 11 may be provided with a suitable exit for fumes, such as (Fig. I) the discharge conduit 12 extending downward from adjacent the enclosure roof 13. In the present instance, the enclosure 10 not only confines fumes from the liquor, etc., to the space 14 over the receptacle 2 to the exclusion of the space 15 beneath it, and so protects various parts and mechanisms in the space 15 (described hereinafter) from such fumes, but also extends down to enclose said latter space and mechanisms, and afford them direct general protection. Or, to state the matter differently, the receptacle structure 1 spans the enclosure 11 at an intermediate point in its height, and thus divides it into separate upper and lower cooking and machinery spaces or chambers, the center of the structure 1, within its inner wall 16, being closed or occluded by a diaphragm or web 17, which may carry a bearing sleeve 18 for an upright shaft (hereinafter described). As an additional protection to the parts and mechanisms in the machinery space 15 against heating from above, the enclosure 11 may also be spanned by a diaphragm 19, located a little below the receptacle 2, and preferably consisting of a metal plate covered with refractory heat-insulating material, such as asbestos.

The manipulating means 3, 4, 6, 7 whereby the doughnuts are formed and fed through the cooking apparatus may preferably be driven or actuated from beneath the receptacle structure 1, by means located in the machinery space 15. As shown (see Figs. I, II and IV), the driving means for this purpose comprises a prime mover such as an electric motor 20, as well as motion transmitting means in the form of reduction and intermittent gearing 21, 22, and a cam 23. The actuating connections from beneath the receptacle 2 include, for the progressing means 4, an upright rotary shaft 24 (in the bearing 18) in the midst of the receptacle, and for the transferring and ejecting means 6, 7, an upright longitudinally movable rod 25 beside the receptacle.

As shown, the motor 20 not only operates the transmitting means 21, 22, 23, etc., through its belt and pulley connection 26, but also drives an air pump or compressor 27 in the chamber 15 through a separate belt and pulley connection 28, and operates a fan 30 mounted directly on the motor shaft. The compressor 27 supplies air under pressure to a pressure system for extruding the dough from the container or magazine of the forming apparatus 3,—being connected by a pipe 31 to deliver into an air storage and pressure equalizing reservoir 32, whence a pipe line 33 (extending up through one of the uprights of the frame 10) conveys the air to the former 3 via a regulator 35. The fan 30 creates suction downward in the fume discharge conduit 12, which extends down beside and below the receptacle 2, within the enclosure 11, to the suction side of the fan housing chamber 36,—whose circular outlet fits into a discharge flue 37 leading to a chimney or stack (not shown). The inclined bottom of the housing 36 may serve as a "trap" for collecting condensed fumes or vapor, and discharging the same by a spout or trough 38 to a subjacent drip pan 39.

In Fig. V is shown a modified arrangement of fume exit and discharge means. As here shown, the fumes are withdrawn downward from the lower region of the cooking chamber or enclosure 14 instead of from the top, and through the midst of the receptacle 2 (whose central diaphragm or web 17 has openings 41 for the purpose), instead of to one side thereof. Accordingly, the fume discharge conduit 12 bends inward at 42, and extends nearly horizontal between the diaphragm 19 and the receptacle bottom to its intake 43. This intake 43 is in the form of an annular, shallow pan surrounding the carrier drive shaft 24, with its upper edges fitting into grooves or recesses 44, 45 in the inner receptacle wall 16 and in the bearing sleeve 18. In other respects, the structure here shown and its operation do not differ materially from those shown in Figs. I, II, and IV,—the fumes being likewise drawn down below the receptacle 2 by the suction created by means of the fan 30 operated by the motor 20.

Returning, now, to Figs. I, II, and IV, it will be seen that in the cooking chamber or compartment 14, over the vessel 2, is a liquor-reserve reservoir 46 with a pet cock 47 by means of which the supply in the vessel 2 may be replenished,—either periodically, or continuously, at a rate regulated in correspondence to the rate of loss by evaporation, etc. The reservoir 46 being thus exposed to the hot fumes and the heat of the liquor in the vessel 2, the reserve supply is always kept liquid (if it is a grease solid or thick when cold), and hot enough to obviate undesirable chilling of the liquor in the vessel by it. In the lower compartment 15 is a tank 48 to which the liquor may be drained off from the bottom of an extra drip pocket or "well" portion 50 of the vessel 2 (that accommodates the manipulating means 6, 7) by means of a valve controlled discharge pipe 51. The height of the liquor in the vessel 2 is automatically controlled and regulated by overflow over a dam 52 on the inner vessel wall 16 and through a discharge pipe 53 leading to the tank 48.

After this general outline of the apparatus shown, my description of its various features of construction and operation in detail will be easily understood.

Still referring to Figs. I, II, III, IV, and V, it will be seen that the structure 1 comprises a quadrangular (square) peripheral apron 54 at the upper edge of the circular vessel 2, here shown as sloping inward so as to drain any splashings of the liquor back into the vessel, and as having an upright flange 55 at its outer edge or margin. The framework 10, it will be seen, comprises tubular supporting uprights or standards 56 ranged around the vessel 2, and cross-bracing frames 57, 58, 59 connecting the uprights above and below the vessel. The apron 54 and the frames 57, etc., are preferably apertured for engagement with the uprights 56; as here shown, they all have hollow bosses or sockets 61 through or into which the uprights extend. These peripheral sockets 61 (located at the corners of the structure 1) may be fastened on the uprights by suitable securing means such as pins or set screws 62,—and so, likewise, the sockets 61 of the cross-braces. The braces 57, 58, and 59 are generally cruciform, and more or less similar to one another; but differ in detail in accordance with the parts and mechanisms of the machine which they support. As here shown, the walls of the enclosure 11 are attached to the frame 10, which they surround. The top or roof 13 and the bottom or floor 63 rest on, and are screwed fast to, the uppermost and lowermost cross-frames 57 and 59; and the side walls or panels 64 have angle braces 65 along their upper and lower edges, and are there detachably secured to corner lugs 66 on the sockets 61 of the frames 57 and 59, as by means of thumb screws 67 and screws 68. Good sized windows 69 in the several panels 64 allow the operations in the cooking compartment 14 to be freely observed, and a hinged door 70 in one of the panels affords convenient access to the machinery compartment 15. The floor 63 is incomplete, and the opening thus afforded admits air to the lower chamber 15, to supply the compressor 27 and for ventilation, etc. As shown, the motor 20 and the compressor 27 are mounted on the lowermost cross-frame 59, while most of the other operating parts and mechanisms in the compartment 15 are suspended or supported from the intermediate cross-frame 58. Ball casters 71 in the lower ends of the uprights 56 allow the machine to be easily moved about.

The construction of the framework 10 just described is not only strong and rigid, but also affords the advantage that when the machine is being assembled, the receptacle structure 1 and the frames 57, 58, and 59 may be shifted up or down relative to one another, to facilitate alignment or coordination of the various parts and mechanisms carried by them, before being finally fixed. Also, the height of the receptacle 2 above the casters 71 may be adjusted (or varied in different machines) as convenience may require.

Referring, now, to Figs. I, II, and VI, it will be seen that the doughnut forming apparatus 3 shown comprises a cylindrical dough container or magazine 75, and a forming device 76 (here of an extruding type) taking dough therefrom. In the present instance, the magazine 75 is removably mounted in a double-walled cylindrical receiver 77 supplemented with an external top flange 78. The receiver 77 is mounted and bolted in and beneath a downward-flanged opening 79 in the enclosure roof 13 and the cross-frame 57; and the former 76 is removably seated at or in a shouldered outlet opening 80 in the receiver bottom, and protrudes downward therethrough. At both bottom and sides, the receiver 77 has an interlining of heat-insulating material 81 (such as asbestos) that serves to thermally insulate the magazine 75 and protect the dough therein from overheating by the fumes, etc., in the cooking compartment 14.

The magazine 75 is removable upward from the receiver 77 through the roof opening 79, and has in its own bottom an outlet 82 for cooperation with and connection to the former intake 83, to supply the latter through the receiver bottom opening 80. As shown, the magazine outlet 82 has the form of a conical neck, and the former intake 83 has a conically flared opening or seat to receive and center it. When the magazine 75 is removed, its outlet 82 is automatically closed by the seating thereover of a check-valve 84 which is held in place and pressed downward by a leaf-spring 85, whose free end is loosely secured to the valve by a headed pin 86, and whose other end is anchored to the magazine bottom by a screw 87. When and after the magazine is put in place, the check-valve 84 is lifted and held off its seat (as shown in Fig. IV) by engagement with the rounded central stem or boss portion of a bridge structure 88 spanning the intake 83. The weight of the magazine 75 and its contents being supported largely or entirely by its conical neck 82, a tight joint of the latter with the intake 83 is insured. Any drippings of dough when the magazine 75 is being removed are caught by a flanged annular guard enlargement 89 that extends upward and outward from and around the upper end of the intake 83 and the magazine outlet 82.

Returning, now, to the former device 76, and referring to Figs. I, VI, VII, and VIII, it will be seen that this former 76 comprises an externally shouldered tubular discharge element 90 that rests on the shoulder of the receiver opening 80 (and whose enlarged upper end forms the intake 83), and also coaxial circular disk and sleeve die elements 91 and 92, which are relatively movable to open or close the annular die outlet at the lower end of the tube 90. The body 90 is normally held in place by engagement of bayonet pins 93 thereon beneath the edges of the receiver opening 80, but can be released for removal by turning it to bring said pins into alignment with slots or grooves 94 located a short distance from stop pins 95 on the bottom. The disk 91 is suspended from the bridge 88 by a central stem 96 whose reduced and threaded upper end screws into the boss of the bridge; and thus the disk is fixed in position, but detachable for cleaning purposes, etc. The sleeve 92 slides up and down (freely, but with a close fit) on the lower portion of the tube 90, which has narrow external circumferential bearing ridges 97. The lower edge of the sleeve 92 is adapted to telescope over the disk 91 with a fairly close but easy fit, and is externally bevel-sharpened to cut or shear off the extruded dough cleanly against the disk periphery.

The clearances between tube 90 and sleeve 92 afforded by the ridges 97 not only minimize friction, but also tend to prevent small amounts of dough from packing between the parts and thereby causing the sleeve to stick. In Fig. VI, the disk 92 is sharpened with an upward bevel at its edge, and is integral with the stem 96; while in Fig. IX, the centrally apertured spherically dished sheet metal disk 98 has an approximately square-sharp edge, and is detachably secured on the reduced lower end of the stem 96 by a knurled thumb nut 99.

The doughnuts deposited by the former apparatus 3 at "A" are progressed by the carrier 4 around the inner and outer courses in the receptacle 2 successively, being transferred from one course to the other at "B" only after they have acquired sufficient stability of form therefor by cooking. During progression, they are supported by the liquor against deformation, and are preferably afloat at its surface most of the time, as shown in Fig. II.

As shown in Figs. II and XIII, a raised annular segmental platform plate 100 (flanged and secured by screws to the inner wall 16) underlies the station "A" and the initial 90° (say) of the inner course, to prevent the raw doughnuts from sinking below the engagement members 5 during the interval before they become buoyant enough (by partial cooking) to rise and float at the surface of the liquor.

In order that the doughnuts may be supplied, released, and introduced into the liquor and into engagement with the members 5 in definite correspondence and correlation with the succession of the moving members, the cutter sleeve 92 may be actuated in like manner. This may preferably be done directly by the rotary carrier or progressing means 4,—which not only definitely maintains the correlation and insures keeping the former 76 and the progressing means 4 "in phase," but also allows them both to be driven or actuated from beneath the receptacle structure 1, through common connection including the shaft 24. As shown in Figs. I, II, and VI, there is an actuating lever for the sleeve 92, comprising a double-armed yoke 101 and a tappet arm 103 united by a rockshaft fulcrum 104, which is journalled in a bearing bracket 105 depending from the bottom of the receiver 77. Normally, the actuating lever is operatively connected to the sleeve 92 by engagement of slotted or forked ends of the lever arms 101 over diametrically opposite pins 106 projecting from a ridge or band 107 on the cutter sleeve 92; and the detachable inclined and horizontal surfaced actuating device or cam portion 108 of the arm 103 lies in the path of actuator members, such as upstanding studs 109 (with anti-friction balls in their ends) on the members 5 of the progressing means 4.

During movement of the progressing means 4, it wipes past and actuates the former arm 103 by means of the studs 109, so as to depress the cutter sleeve 92 over the disk 91, very quickly each time; close the annular die opening; and sever the extruded annular dough formation. As the end of the cam 108 trips past each stud 109, and is released, the cutter sleeve 92 rises again very quickly, and reopens the die outlet. The action is such that the formations are released to drop in horizontal position, so as not to be deformed from their proper shape when they strike the liquor. Also, the interruption and resistance to flow of the dough incident to each cutting operation are very slight and brief, so that maximum capacity is secured.

The normal width of die-opening may be varied and regulated by adjusting a screw 111 (with a lock nut 112) threaded in a rearward extension 113 of the lever arm 103, and normally resting against a buffer seat 114 on the bottom of the receiver 77. As shown in Fig. I, a helical tension spring 115 connected to the rear end of the arm extension 113 normally maintains the die elements in open position, and also raises the cutter sleeve 92 practically instantaneously when the arm 103 drops off each stud 109. In addition, this spring 115 practically prevents movement of the cutter-actuating lever beyond its normal range, to a point where disengagement from the pins 109 would be possible.

The shock and vibration of the hammer blow transmitted to the dies 91, 92, from the impact of the screw 111 on the buffer 114 (which may be of leather or other suitable material) when the actuating lever is suddenly released counteracts any tendency of the doughnuts to stick to the die elements after severance, and thus insures prompt, clean doffing. Operation of the former 76 may be suspended, when desired, by relaxing the tension spring 115 until it will no longer raise the cutter sleeve 92 after the same is depressed to close the die outlet. As shown, the upper end of the spring 115 is connected to a lever 116 loosely pivoted at 117 to the enclosure roof 13 or the top frame 57. This lever 116 normally rests in a notch of an adjacent bracket 118 at such a height as to keep the spring 115 under adequate tension; but by first lifting the lever 116 from its notch and then shifting it sidewise clear of the bracket, it may be lowered so as to relax the spring completely.

In order to take the forming device 76 apart after the dough magazine 75 has been removed from the receiver 77, it is convenient to relax the spring 115 as just described, and allow the fork-ended yoke arms 101, 101 to swing downward beyond their normal range of movement, until they clear and disengage the pins 106. This releases the cutter sleeve 92, and leaves it free to drop off the tubular element 90. The tubular element 90 may then be conveniently lifted from its seat in the receiver aperture 80 and out through the roof opening 79.

In order that the dough may be fed from the magazine 75 to the former 76 and extruded from the latter by compressed air, the magazine is provided with a cover 120 which is held in place by a clamp screw 121 in a yoke 122 whose ends take under an external top ring or flange 123 on the magazine, and is made air-tight by an inset resilient gasket 124 (of rubber or the like) whose sealing face engages an upstanding annular shoulder 125 on the ring 123. Compressed air supplied from the reservoir 32 through the pipe line 33 and the regulator 35 is admitted to the magazine 75 through a circumferentially ridged nipple 126 screwed into the cover 120. The portion of the air line 33 beyond the regulator 35 consists of flexible pressure tubing or hose 127, whose flexibility allows the cover 120 to be removed from the magazine 75 for replenishment of the latter with dough without detachment of the air line from the cover. When the cover 120 is removed, air pressure can be shut off from the hose connection 127 by means of a stop valve 128 (Fig. I).

As a means of feeding and extruding the dough, air pressure presents the important advantage over many mechanical means of feeding that it obviates agitation or working of the dough, which tends (if very intense or prolonged) to toughen the dough and the doughnuts ultimately produced from it. In order to prevent agitation of the dough by the air stream from the nipple 126 and to assure more even feeding, a light dished inner cover 129, fitting loosely in the magazine 75, may be kept on top of the mass of dough. The effective pressure of the air and the rate of extrusion at the former 76 may be regulated and varied ad libitum by means of the device 35.

As shown in Figs. I, X, and XI, the regulator 35 is of a bleed or constant pressure relief valve ("safety-valve") type, comprising a conical valve 130 in a barrel housing 131. This valve 130 is continually urged toward its rather wide conical seat by a helical compression spring, acting between the valve and a screw plug abutment and guide 132 adjustable in the other end of the housing 131. The valve stem has longitudinal air passages 133, 134, the latter of which obviate formation of any air cushion in the bore of the guide 132. Whenever the air pressure in the system becomes very slightly excessive, it forces the valve 130 off its seat and escapes through the ample vents 135, shown as opening through the seat. A pointer 136 on the plug 132 cooperates with a graduated scale segment 137 on the housing 131. By a proper setting of the initial tension of the spring by adjustment of the screw plug 132, the device can be made to maintain any desired constant pressure in the system, and the rate of extrusion of the dough thus varied and regulated very accurately, according to the size of doughnuts desired, and irrespective of the rate of production to be maintained.

A pressure gauge 138 (Fig. I) connected to a fourway fitting 139 through which the tube 127 is connected to the pipe line 33 affords a convenient indication of the air pressure actually existing in the system, and applied to the dough in the container 75, at any time.

Referring, now, to Figs. I and II, it will be seen that the engagement members 5 of the rotary carrier 4 shown have the form of uniformly spaced radial vanes extending downward from the surface of the cooking liquor, and serving to progress the doughnuts in definitely and positively maintained separation and succession. The vane members 5 radiate from an inner ring 140, and are additionally inter-connected, about at mid-length, by circumferential webs 141; so that the carrier 4 as a whole affords two concentric rows of cooking cells for the individual doughnuts. This multicellular carrier 4 is rotatably mounted and centered on the inner wall portion 16 of the annular liquor trough or channel 2, by means of bearing lugs 142 that project inward from the ring 140 and rest on an annular bearing shoulder 143 about mid-height of said inner trough wall.

As shown in Figs. I, II, and VI, the former-actuating studs 109 are screwed into socket holes 144 in the vanes 5, at the regions of union with the circumferential webs 141. The arrangement of the parts is such that the former 3 is actuated to release the dough formations substantially as the carrier cells of the inner row are individually presented beneath the die outlet to receive them. By removing or omitting these studs 109 from any desired ones of the vanes 5, the former 3 can be pro tanto left unactuated and rendered inactive,—so as not to deposit any doughnuts in the corresponding carrier cells,—and the output of the machine correspondingly reduced. For convenience in thus selectively controlling the actuation of the former 3 and the introduction of articles into the individual carrier cells and adjusting and varying the output, a plurality of concentric rows or groups of sockets 144 may be provided, as shown, so that they can be kept differently equipped with selective actuators 109, according to the different schedules of production to be maintained at different times. This allows the rate of output to be changed very quickly by simply shifting the actuating device 108 laterally from a position where it cooperates with one row of actuators 109 to one where it will cooperate with a different row. The cam piece 108 can be thus laterally shifted by simply removing the bolt 145 that holds the tappet arm 103 fixed on the squared end of the rockshaft 104, sliding the tappet arm along said rockshaft, and replacing the bolt 145 in the proper one of the appropriately located holes 146 (Fig. II) in said shaft. As here shown, an intermediate row of sockets 144 has a full complement of 12 studs; an outer row a one-third complement of four studs; and an inner row a one-half complement of six studs; but obviously the number and arrangement of socket rows and studs may vary greatly, according to the number of carrier cells provided, etc.

In the modified construction illustrated in Fig. XII, the actuator studs 109 are mounted on readily removable U-shaped sheet metal spring clips 147, which embrace the vanes 5 and have slots 148 in their curl-ended legs to accommodate the webs 141. As here indicated, there is one single stud 109 on each end of each clip 147; so that by simply turning the clip end for end, this stud can either be brought into a position inside the web 141, where it will actuate the cam piece 108 in Fig. II, or into the inactive position outside said web shown in Fig. XIII. Such a reversal is so easily made that with this mounting of the studs 109, there is little occasion for shifting the cam piece 108 in order to vary the output of the machine.

Referring, now, to Figs. I and IV, it will be seen that in the machinery compartment 15 there is a horizontal transverse countershaft 150 (mounted in bearing brackets 151 depending from the cross-frame 58), continuously driven by the motor 20 through the reduction gearing 21. Besides the reducing belt and pulley drive 26 from the motor 20 to the short shaft 152 (mounted in bearing brackets 153 depending from the cross-frame 58), the reduction gearing 21 comprises a worm wheel on the shaft 150 and a worm therefor on the shaft 152, as shown. From the shaft 150, the former 3 and the progressing means 4 on the one hand, and the shifting means 6, 7 on the other hand, are separately actuated.

Through the intermittent gearing 22, the continuously revolving shaft 150 drives the upright rotary transmission shaft 24, that extends up through the midst of the receptacle 2, and is journalled in the bearing 18 and in a bearing 154 at the lower side of the cross-frame 58. The shaft 24 is connected to drive the carrier 4 by means of a two-armed propelling member 155 (see Fig. II) keyed fast (by a screw or pin 156) to the upper end of said shaft above the inner trough portions 16, 17. The ends 157 of the radially extending arms of this member 155 engage between upstanding, inward-projecting lugs 158 on the ring 140, so that relative movement of the parts to compensate for defects or variations of alignment is permitted. In order to insure that when removed for any purpose the carrier 4 shall always be replaced in the same angular relation to the shaft 24, the holes for the key or screw 156 may be bored off center, and the widths of the driving arm ends 157 and of the spaces between the corresponding pairs of lugs 158 may be made different, as shown. The shaft 24 is supported or suspended by engagement of the hub portion of the member 155 with the bearing 18, and is held against longitudinal displacement the other way by a collar 159 fast on the shaft just below the lower bearing 154. The cam 23 is fast on one end of the shaft 150, and is of generally oval outline, with a facial groove formed by an overhanging skirt or flange portion 160. This cam 23 actuates a rock lever 161 (fulcrumed on a bracket 162 depending from the cross-frame 58) through a roller 163 on one arm of said lever; and through a short link 164, the lever 161 actuates the upright rod 25, which is mounted and guided for vertical reciprocation (through an opening 165 in the apron 54) between pairs of peripherally grooved anti-friction rollers 166 carried by bracket arms 167 clamped fast to one of the frame uprights 56. From the rod 25, as already mentioned, motion is taken to actuate the manipulating means 6, 7.

Considerable elevation of the upper bearing 18 above the liquor level in the trough 2 (as shown) is desirable, in order to insure against entry of liquor into the bearing beneath the overlying hub of the member 155,—whether by splashing, or by capillary or other creeping up of the liquor. It is very desirable to prevent this, because of the tendency of the hot liquor to carbonize when exposed to the air in a thin film, and to cake up and clog the bearing, and interfere with proper lubrication thereof by and from the lubricating cup 168 in the upper end of the shaft 24.

Still referring to Figs. I and IV, it will be seen that the intermittent gearing 22 comprises a worm element 170 of varying pitch fast on the shaft 150, and an intermeshing worm gear wheel or disk 171,—whose teeth and notches correspond in number to the vanes 5 of the carrier 4,—fast to the lower end of the shaft 24. The continuous thread 172 of the worm 170 comprises two parallel, circular or "pitchless", approximately coextensive partial turns (extending, as shown, about three-quarters of a turn), and an inclined or helical partial turn (extending about one-quarter turn) interconnecting them. By continuous rotation of the shaft 150, a variant, periodic, intermittent step by step movement (uni-directional) is definitely and positively imparted to the carrier 4,—each step corresponding to one cell space, and the intervals or "dwells" between steps lasting about thrice as long as the step movements. During the intervals of rest of the carrier 4, the two pitchless thread segments traverse and engage adjacent gear notches, and thus lock the carrier securely and positively against rotation.

The worm gear sets at 21 and 22 may be lubricated by partial immersion in a common subjacent grease or oil pan 173 conveniently suspended by detachable bearing straps 174 over the shaft 150 and by a hook link 175 pivoted to the bearing 154 and detachably engaging a lug on said pan.

Referring, now, to Figs. I, II, and XIV–XVI, it will be seen that the manipulating means 6, 7 comprises two very similar grid-like devices, conforming in outline to the interiors of the inner and outer carrier cells respectively, and located beneath the inner and outer courses of the receptacle 2. The device 170 transfers partially cooked doughnuts from the inner to the outer course of the receptacle 2, as already mentioned, and may also invert them; and the device 171 ejects fully cooked doughnuts from the receptacle 2 and from the machine. These devices 6 and 7 are mounted on arms of a common "elevator" bracket 176. The bracket 176 is attached to the lower end of a rod 177, adapted to reciprocate vertically in a recess 178 in the outer trough wall, and adjustably clamped fast and secured in the outer end of a bracket arm 179, which is itself similarly clamped and secured to the vertically reciprocating rod 25. Thus these shifting devices 6, 7 are periodically moved up and down by the cam 23.

The grid member of the device 6 comprises a sheet metal stamping 180 with a plurality of tines (longitudinally embossed or corrugated upward to stiffen them) integrally united by a web 181 (with a lateral flange 182), which is screwed fast at 183 to a flat fulcrum or pivot bar 184 with rounded trunnion ends. The grid 180 is pivoted or fulcrumed by its trunnions in the apertured bearing members 185 of a U-shaped yoke 186 screwed fast to one arm of the bracket 176. Normally, the grid 180 rests horizontal on inward-bent stop portions 187 of the member 186, and is pulled and held down in that position by a helical tension spring 188 connected between the bracket 176 and a down-turned lug 189 on the grid stamping. A sheet metal hook 190 is pivoted to the grid web 181 by a pin 191 held in place by passage of one of the screws 183 through its flattened and apertured end, and hangs down through an opening in said web 181, and its upstanding flange 182; and a tongue of metal 192 displaced to form the opening for the hook 190 is bent downward to serve as a stop for keeping the hook from swinging too far to the right (speaking with reference to Fig. XIV).

The configuration of the cam 23 is such that the bracket 176 is normally submerged (and stationary at the bottom of the receptacle pocket 50) with the grid 180 beneath the inner doughnut course and beneath the path of movement of the carrier 4, as shown in Fig. XIV. During the periods of rest of the carrier 4, however (when it is securely locked by the pitchless worm threads 172), the bracket 176 is raised by the cam 23 sufficiently to lift the grid 180 through the superjacent carrier cell a little above the liquor level (and, indeed, above the top of the carrier parts 5 and 141), and then quickly returned to the position of Fig. XIV. About as the horizontal grid 180 has lifted the superjacent doughnut out of the liquor, the hook 190 catches on the lower edge of the carrier web 141 (see Fig. XIV) so that the continued upward movement of the fulcrum 184 causes the grid 180 to tilt outward (to the left in Fig. XIV), and transfer the doughnut then on the grid to the radially adjacent carrier cell of the outer course. With the height of the flange or ledge 182 shown, the doughnut will be prevented from simply sliding outward off the grid 180 when the latter reaches a sufficient inclination, and compelled to remain on the grid until the momentum of the final rapid swing of the latter causes the doughnut to turn on the ledge 182 as a fulcrum and fall or "flop" into the outer cell of the carrier in inverted position,—all as indicated by the dot and dash lines in Fig. XIV.

Except for a difference in grid configuration to conform to the different shape of the outer carrier cells, the ejector device 7 is substantially like the transfer device 6, as regards both construction and operation. Instead of engaging the carrier 4, however, its swinging hook 190 is actuated by engaging a stop 194 detachably screwed fast to the outer wall of the receptacle 2 (see Figs. I and XIX).

The device 7 discharges the fully cooked doughnuts through a corresponding opening 195 in one of the panels 64 to a subjacent delivery chute 196 mounted on the panel. As shown, the bottom of the chute 196 has an anti-friction drainage grid 197 composed of a number of sloping wires welded to a few horizontal cross-wires, and a drip pan 198 suspended beneath the lower end of the chute serves to catch the grease that drains from the ejected doughnuts.

In the construction illustrated in Figs. XVII, XVIII and XIX, provision is made for heating the cooking liquor by gas instead of by electricity. As here shown, the receptacle structure 1 is provided with a subjacent heating "reservoir," formed by inside and outside circumferentially extending guides 202, 203 which are in effect extensions of the inner and outer walls of the trough 2 downward below its bottom,— about even with the bottom of the pocket 50. Besides the depending guide flanges 202, 203, the structure 1 has intermediate radially extending guides 204, 205, spaced about 45° apart, formed as flanges on its bottom and serving to direct products of combustion radially outward along the pan bottom. At the corners of the structure 1, the outer guide 202 is "joggled" or recessed outward beneath the apron 54, as shown at 206, so as to merge into the lower socket flanges 61 for the frame posts 56 and serve as outward extensions of the radially extending channels formed by the guides 204, 205. Within the guide recesses 206, the apron 54 is apertured as shown at 207, to afford passage for products of combustion or "fumes" from the outer ends of the radially extending guide channels into the enclosure over the receptacle 1.

The inner guide 202, it will be seen, is of service in keeping the hot products of combustion away from the transmission shaft 24 that extends up within it through the midst of the receptacle 2. As shown, the shaft bearing 18 in the central plate 17 is further protected by a sleeve 208 extending down from said bearing, and provided with a close fitting or supplemental bearing portion 209 at its lower end. This sleeve 208 is braced by webs 210, which are virtually extensions of the diagonal guides 205 inward from the inner wall portion 16 of the receptacle 2. At a central region, intermediate the circumferential guides 202 and 203, is mounted a circularly bent gas burner 211, for heating the receptacle 2 and its contents. This burner 211 extends around the shaft 24 well above the driving means, and may be suspended from the guides 204 by wire rod hangers 212 hooked through holes in the latter.

In Fig. XVII, minor modifications of various parts of the machine are illustrated. As here shown, the former-actuating studs 109 are provided with anti-friction rollers 219 pivoted in their forked upper ends, instead of with anti-friction balls such as illustrated in Figs. I and II. Also, the cam plate 108 by which the studs 109 actuate the former trip lever 113 is made directly adjustable, transversely, by means of screw or bolt and slot connections 220,—instead of being shifted sidewise indirectly, by adjustment of said lever 113 on its axis 104. The carrier propelling arms 155 have forked ends 221, with opposed set screws 222 adjustable to afford suitably loose but close driving engagement with intermediate upstanding lugs 223 on the carrier ring 140. The grids of the transfer and ejector devices 6 and 7 are not formed of die stampings, as in Figs. II and XVII, but of stout wire rod 225 bent to U-form with the ends of the U's fastened directly in holes in the pivot bars 184.

Throughout all the various figures of the drawings that illustrate modifications, substantially unmodified parts and features have been marked with the reference characters applied to like parts in the other figures, as a means of dispensing with merely repetitive description.

Having thus described my invention, I claim:

1. Apparatus of the character described comprising a receptacle for cooking liquor; means for feeding doughnuts through the receptacle; and means for supplying doughnuts to the receptacle actuated directly by said feeding means.

2. Apparatus of the character described comprising means for progressing articles to be cooked in cooking liquor; and means for forming the articles adapted for direct actuation by movement of said progressing means.

3. A machine for forming articles such as doughnuts and cooking them with hot liquor comprising a succession of moving members for progressing the doughnuts in the liquor; and a doughnut former actuated by said members.

4. Apparatus of the character described comprising means for progressing articles such as doughnuts in cooking liquor; and a doughnut former thereover actuated directly by said progressing means.

5. Apparatus of the character described comprising intermittently operative means for progressing articles to be cooked in cooking liquor; and means for forming the article adapted for direct actuation by the periodic movement of said progressing means.

6. Apparatus of the character described comprising means for forming articles to be cooked; and multi-cellular means for progressing the articles in cooking liquor adapted to actuate said forming means directly to release the formations as the cells are individually presented to receive them from said means.

7. Apparatus of the character described comprising means for progressing doughnuts in cooking liquor, means for supplying the doughnuts for progression as aforesaid, and means for selectively actuating said latter means in definitely maintained correspondence and correlation with the movement of said progressing means, so that the output of cooked doughnuts may be controlled and varied.

8. Apparatus of the character described comprising means including a succession of moving members for progressing articles in cooking liquor in definitely maintained separation and succession; means for introducing the article into engagement with said members, for progression by them as aforesaid, actuated by said progressing means in accordance with the succession of said members; and means for selectively controlling the actuation of said introducing means as aforesaid, so as to vary and control the output of cooked articles.

9. Apparatus of the character described comprising multicellular means for progressing articles to be cooked in cooking liquor; and means for introducing the articles into the individual cells of said progressing means operating in definitely maintained correspondence and correlation with its movement, but selectively controllable to control and vary the output of cooked articles.

10. In a machine for forming articles such as doughnuts and cooking them with hot liquor, the combination of means including a succession of moving members for progressing the doughnuts in the liquor; a doughnut former actuated by said progressing means in definite correspondence and correlation with the succession of said members; and means for selectively controlling the actuation of the former as aforesaid, to control and vary the output of the machine.

11. Apparatus of the character described comprising means for forming articles to be cooked; means including a succession of moving members for progressing the articles in cooking liquor; and selective actuators carried by said members for actuating said forming means.

12. Apparatus of the character described comprising means for forming articles to be cooked; means including a succession of moving members for progressing the articles in cooking liquor; and selective actuators for said forming means attached to spring clips adapted to straddle the aforesaid moving members.

13. Apparatus of the character described comprising means including a succession of moving members for progressing articles to be cooked in cooking liquor; rows of actuators carried by said members; and means for forming and introducing articles to be cooked for progression by said progressing means, with an actuating device shiftable to cooperate with different rows of said actuators.

14. Apparatus of the character described comprising an extruding former for articles to be cooked, with severing means at its outlet; and means for progressing the articles in cooking liquor, with a succession of moving members for intermittently actuating said severing means.

15. Apparatus of the character described comprising an extruding former for articles to be cooked including die members relatively movable to open and close an annular outlet; an actuating arm therefor; and means for progressing the articles in cooking liquor, with means adapted to wipe past and actuate said arm.

16. Apparatus of the character described comprising an extruding former for articles to be cooked including a cutter sleeve slidable up and down to open or close an annular die outlet; a lever in actuating connection with said sleeve; and means for progressing the articles in cooking liquor, with means adapted to engage and actuate said lever.

17. Apparatus of the character described comprising an extruding former including die elements relatively movable to open and close an annular outlet, with means for normally maintaining said die elements in open position; an actuating arm for said former; means for progressing the formations in cooking liquor, with means adapted to wipe past and actuate said arm to close the die opening; and means for transmitting to the die a hammer blow or shock from the sudden release of said arm, to facilitate doffing of formations.

18. Apparatus of the character described comprising an extruding former for articles to be cooked, including die members relatively movable to open and close an annular outlet; a lever normally in actuating connection with one of said members, but disengageable therefrom by movement beyond its normal range; means for progressing the doughnuts in cooking liquor, with means adapted to wipe past and actuate said lever; and means normally preventing movement of said lever to the point of disengagement.

19. Apparatus of the character described comprising a receptacle for cooking liquor; means for progressing articles such as doughnuts in said receptacle; a doughnut former over said receptacle actuated directly by said progressing means; and means for actuating said progressing means from beneath said receptacle.

20. Apparatus of the character described for forming articles such as doughnuts and cooking them in hot liquor comprising a receptacle for cooking liquor; a doughnut former over said receptacle; means for manipulating doughnuts during cooking in said receptacle; and means for actuating said former and said manipulating means, including a common actuating connection from beneath said receptacle.

21. Apparatus of the character described for forming articles such as doughnuts and cooking them in hot liquor comprising a receptacle for cooking liquor; a doughnut former over said receptacle; means for manipulating doughnuts during cooking in said receptacle; and means for actuating said former and said manipulating means from beneath said receptacle, with actuating connection for them extending up through the midst of the receptacle.

22. Apparatus of the character described comprising a receptacle for cooking liquor; means for progressing articles such as doughnuts during cooking in said receptacle, with actuating connection from beneath the same; and a doughnut former over said receptacle also actuated through said connection.

23. Apparatus of the character described comprising a receptacle for cooking liquor; a rotary carrier for progressing articles such as doughnuts in said receptacle; means for actuating said carrier from beneath said receptacle, including a rotary drive shaft therefor extending up through the midst thereof; and a doughnut former over said receptacle also actuated through said shaft.

24. In apparatus of the character described the combination of a receptacle for cooking liquor; a doughnut former over said receptacle; and means for actuating said former from beneath said receptacle, with actuating connection extending up through the midst of the receptacle.

25. Apparatus of the character described for forming articles such as doughnuts and cooking them in hot liquor comprising a receptacle for cooking liquor; a doughnut former over said receptacle; means for manipulating doughnuts during cooking in said receptacle; and a transverse shaft beneath said receptacle, with means for separately actuating said former and said manipulating means from said transverse shaft.

26. Apparatus of the character described comprising a receptacle for cooking liquor; means for progressing articles such as doughnuts in the liquor; means for shifting the doughnuts movable up and down in said receptacle; and a transverse shaft beneath said receptacle, with means for separately actuating said progressing and said shifting means from said transverse shaft.

27. Apparatus of the character described comprising a receptacle for cooking liquor; means for progressing articles such as doughnuts in the liquor; means for shifting the doughnuts movable up and down in said receptacle; and a transverse shaft beneath said receptacle, with intermittent gearing for actuating said progressing means from said transverse shaft, and a cam thereon for actuating said shifting means.

28. Apparatus of the character described comprising a receptacle for cooking liquor; a rotary carrier for progressing articles such as doughnuts in said receptacle during cooking; and means for imparting a variant movement to said carrier comprising a rotary drive shaft extending down through the midst of said receptacle with a worm gear on it therebeneath, and a worm of varying pitch for actuating said worm gear.

29. In apparatus of the character described, the combination of an annular trough for cooking liquor; a rotary carrier for progressing articles such as doughnuts in said trough; and a drive shaft for said carrier within the inner portion of said trough.

30. In apparatus of the character described, the combination of an annular trough for cooking liquor, with a diaphragm across its center; a rotary carrier for progressing articles such as doughnuts in said trough; and a drive shaft for said carrier journalled in bearing means on said diaphragm.

31. Apparatus of the character described, comprising a receptacle for cooking liquor; a carrier for progressing articles such as doughnuts in the liquor rotatably supported in said receptacle; a central drive shaft for said carrier; with means of connection between drive shaft and carrier permitting relative movement to compensate for defects or variations of alignment.

32. Apparatus of the character described comprising a receptacle for cooking liquor; a carrier for progressing articles such as doughnuts in the liquor rotatably supported in said receptacle; and a central drive shaft for said carrier, with a radially extending member in driving engagement therewith.

33. In apparatus of the character described, the combination of an annular trough for cooking liquor; a carrier for progressing doughnuts in said trough rotatably mounted on the inner portion of said trough; an upright drive shaft within said inner portion of said trough; and a member on said shaft above said inner portion of the trough in driving connection with said carrier.

34. In apparatus of the character described, the combination of an annular trough for cooking liquor with an annular bearing shoulder on its inner portion, and a carrier for progressing doughnuts in said trough rotatably mounted on said shoulder.

35. In apparatus of the character described, the combination of an annular trough for cooking liquor with an extra deep pocket; means for progressing articles such as doughnuts in said trough; and means normally submerged in said pocket beneath the path of said progressing means movable upward to shift the doughnuts relatively to said progressing means.

36. Apparatus of the character described comprising means for progressing articles such as doughnuts in hot cooking liquor; and means for imparting a step by step movement to said progressing means comprising a worm wheel and a coacting worm with both pitched and pitchless thread portions.

37. In apparatus of the character described, the combination of means for progressing articles such as doughnuts in hot cooking liquor comprising a succession of moving members; and manipulating means normally submerged beneath the path of movement of said members, including an elevator, a member pivoted to said elevator to swing upward, and a hook depending from said member for engaging an adjacent part to swing the member as aforesaid when said member is raised between progressing members by said elevator.

38. Apparatus of the character described comprising a receptacle for hot cooking liquor with an enclosure thereover; means for supplying doughnuts, including former means in said enclosure over said receptacle; and means for actuating said former means from beneath said receptacle.

39. Apparatus of the character described comprising a receptacle for hot cooking liquor with an enclosure thereover; means for supplying doughnuts, including former means and a dough magazine in said enclosure; means for manipulating doughnuts during cooking in said receptacle; and means for actuating said forming and manipulating means from beneath said receptacle.

40. Apparatus of the character described comprising a receptacle for hot cooking liquor; an enclosure thereover for confining hot fumes from the liquor; a former in said enclosure; and a removable dough magazine with an outlet for connection to said former.

41. Apparatus of the character described comprising a receptacle for hot cooking liquor; an enclosure thereover for confining hot fumes from the liquor; a former in said enclosure; and a removable dough magazine with an outlet for connection to said former, and means for automatically closing said outlet when the magazine is removed.

42. Apparatus of the character described comprising a receptacle for hot cooking liquor; an enclosure thereover having in its wall an opening for a dough magazine; and means for supplying raw articles to be cooked, including a dough magazine in said enclosure removable through said opening, and a former taking dough from said magazine.

43. Apparatus of the character described comprising a receptacle for hot cooking liquor: an enclosure thereover having in its roof an opening for a dough magazine; and means for supplying raw articles to be cooked, including a removable magazine in said opening, and a former taking dough from said magazine.

44. Apparatus of the character described comprising a receptacle for hot cooking liquor; an enclosure thereover with a receiver therein, an opening from said receiver through the enclosure wall, and an outlet from said receiver to a former; and a dough magazine in said receiver removable through the aforesaid opening and having an outlet for supplying the former through the receiver outlet.

45. Apparatus of the character described comprising a receptacle for hot cooking liquor; an enclosure thereover with a receiver therein, an opening from said receiver through the enclosure wall, and an outlet from said receiver to a former; and a dough magazine in said receiver removable through the aforesaid opening, with means for automatically closing said outlet when the receiver is removed.

46. Apparatus of the character described comprising a receptacle for hot cooking liquor; an enclosure thereover, with an opening for a dough magazine in its roof; a receiver with apertured bottom in said enclosure beneath said opening; a removable former at said aperture; and a dough magazine in said receiver removable through said roof opening, and having an outlet for cooperating with said former.

47. Apparatus of the character described comprising a receptacle for hot cooking liquor; an enclosure thereover, with an opening for a dough magazine in its roof; a receiver with apertured bottom in said enclosure beneath said opening; a removable former seated in and protruding through said aperture; and a separately removable dough magazine in said receiver for supplying said former.

48. Apparatus of the character described comprising an enclosure; a receptacle for hot cooking liquor spanning the enclosure intermediate its height and thus dividing it into upper and lower chambers; dough manipulating means in the upper chamber; and means in the lower chamber for actuating said manipulating means.

49. Apparatus of the character described comprising an enclosure; a receptacle for hot cooking liquor spanning the enclosure intermediate its height and thus dividing it into upper and lower chambers; means in the upper chamber for forming articles such as doughnuts and depositing them in the receptacle, for shifting the doughnuts in said receptacle, and for ejecting them therefrom and from the enclosure; and means in the lower chamber for actuating said forming and depositing, shifting and ejecting means.

50. Apparatus of the character described comprising a receptacle for cooking liquor; a framework comprising supporting uprights around said receptacle, and cross-bracing frames connecting said uprights above and below said receptacle; means for the attachment of enclosing walls about said receptacle to said framework; dough manipulating means in the upper compartment of such enclosure; and means for atcuating said latter means carried by the frame below said receptacle.

51. Apparatus of the character described comprising a receptacle for cooking liquor; a framework comprising supporting uprights around said receptacle, and cross-bracing frames connecting said uprights above and below said receptacle; means for supplying articles such as doughnuts carried by the frame over said receptacle; means for manipulating the doughnuts during cooking in the receptacle; and means for actuating one of said latter means carried by the frame below said receptacle.

52. Apparatus of the character described comprising a receptacle for cooking liquor with peripheral sockets; a framework comprising supporting uprights extending through said sockets, and cross-bracing frames with sockets for said uprights connecting them above and below said receptacle; means for supplying articles such as doughnuts carried by the frame over said receptacle; means for manipulating the doughnuts during cooking in the receptacle; and means for actuating one of said latter means mounted on the bracing below said receptacle.

53. Apparatus of the character described comprising a receptacle for cooking liquor with a peripheral apron apertured for engagement with supporting uprights; a framework including uprights engaged with said apron, and cross-bracing frames connecting said uprights above and below said receptacle; means for supplying articles such as doughnuts carried by the frame over said receptacle; means for manipulating the doughnuts during cooking in the receptacle; and means for actuating one of said latter means carried by the frame below said receptacle.

54. Apparatus of the character described comprising a receptacle for hot cooking liquor with an enclosure thereover; dough manipulating means in said enclosure; and means for withdrawing fumes from said enclosure downward below said receptacle.

55. Apparatus of the character described comprising a receptacle for hot cooking liquor with an enclosure thereover; dough manipulating means in said enclosure; and means below said receptacle for drawing fumes downward from the enclosure.

56. Apparatus of the character described comprising a receptacle for hot cooking liquor with an enclosure thereover; dough manipulating means in said enclosure; driving means for actuating said manipulating means; and means for withdrawing fumes from said enclosure operated by said driving means.

57. Apparatus of the character described comprising a receptacle for hot cooking liquor with an enclosure thereover; dough manipulating means in said enclosure; means including a motor beneath said receptacle for actuating said manipulating means; and means operated by said motor for withdrawing fumes from said enclosure.

58. Apparatus of the character described comprising a receptacle for hot cooking liquor with an enclosure thereover; means for forming articles such as doughnuts in said enclosure over the receptacle; and means for withdrawing the fumes from the lower region of said enclosure.

59. Apparatus of the character described comprising a receptacle for hot cooking liquor with an enclosure thereover; means for forming articles such as doughnuts in said enclosure over the receptacle; and means below said receptacle for creating suction to withdraw the fumes downward from the lower region of said enclosure.

60. Apparatus of the character described comprising a receptacle for hot cooking liquor with an enclosure thereover; dough manipulating means in said enclosure; and means for withdrawing fumes from said enclosure downward through the midst of said receptacle.

61. Apparatus of the character described comprising a receptacle for hot cooking liquor with an enclosure thereover; means for forming doughnuts in said enclosure over the receptacle; and means for withdrawing fumes from said enclosure downward through the midst of said receptacle.

62. Apparatus of the character described comprising a receptacle for hot cooking liquor with an enclosure thereover; dough manipulating means in said enclosure; means including a motor for actuating said manipulating means; and means operated by said motor for withdrawing fumes from said enclosure downward through the midst of said receptacle.

63. Apparatus of the character described comprising an annular receptacle for hot cooking liquor with an enclosure thereover; a rotary carrier for progressing articles such as doughnuts in said receptacle; driving means beneath said receptacle for operating said carrier, with connection extending up through the midst of said receptacle; and means operated by said driving means for withdrawing fumes from said enclosure downward through the midst of said receptacle.

64. Apparatus of the character described comprising a receptacle for cooking liquor with an enclosure thereover, and passage for fumes from beneath said receptacle into said enclosure; dough manipulating means in said enclosure; heating means beneath said receptacle discharging its fumes via the aforesaid passage to said enclosure; and means for withdrawing fumes from said enclosure downward below said receptacle.

65. Apparatus of the character described comprising a receptacle for cooking liquor with an enclosure thereover, passage for fumes from beneath said receptacle into said enclosure, and exit for fumes from the latter; dough manipulating means in said enclosure; and means for heating said receptacle discharging its fumes via the aforesaid passage.

66. A machine of the character described comprising, in combination, a receptacle for cooking liquor with an enclosure thereover, passage for fumes from beneath said receptacle into said enclosure, and exit for fumes from the latter; dough manipulating means in said enclosure; driving means beneath said receptacle for actuating said manipulating means, with connection extending up through the midst of said receptacle; and heating means beneath said receptacle above said driving means discharging its fumes via the aforesaid passage to said enclosure.

67. Apparatus of the character described comprising a round receptacle for cooking liquor with radially extending channels at its bottom; an enclosure thereover, and passage for fumes from the ends of said channels into said enclosure and exit for fumes from the latter; dough manipulating means in said enclosure; and heating means beneath said receptacle.

68. Apparatus of the character described comprising an annular receptacle for cooking liquor with inside and outside circumferentially extending guides and intermediate radially extending guides at its bottom, an enclosure over said receptacle, and passage for fumes from the radially extending channels formed by said guides into said enclosure and exit for fumes from the latter; means for progressing articles to be cooked during cooking in said receptacle; driving means beneath said receptacle for operating said progressing means, with connection extending up through the midst of said receptacle within the inner guide aforementioned; and heating means beneath said receptacle above said driving means extending around said connection at a region intermediate the aforesaid circumferential guides.

69. Apparatus of the character described comprising a receptacle structure with an annular trough for the cooking liquor and an apertured apron thereabout, means for progressing articles to be cooked during cooking in said receptacle, inside and outside circumferentially extending flanges depending from the bottom of said structure and including between them the apertures in said apron, and means for directing heating gases outward along the bottom of the pan to said apertures.

In testimony whereof, I have hereunto signed my name at Philadelphia, Pennsylvania, this sixth day of March, 1922.

JOHN C. BERGNER.

Witnesses:
JAMES H. BELL,
E. L. FULLERTON.